Oct. 20, 1931.  E. M. SALERNI  1,828,683
DISTILLATION OR HEAT TREATMENT OF CARBONACEOUS OR LIKE MATERIALS
Filed Jan. 6, 1927   2 Sheets-Sheet 1
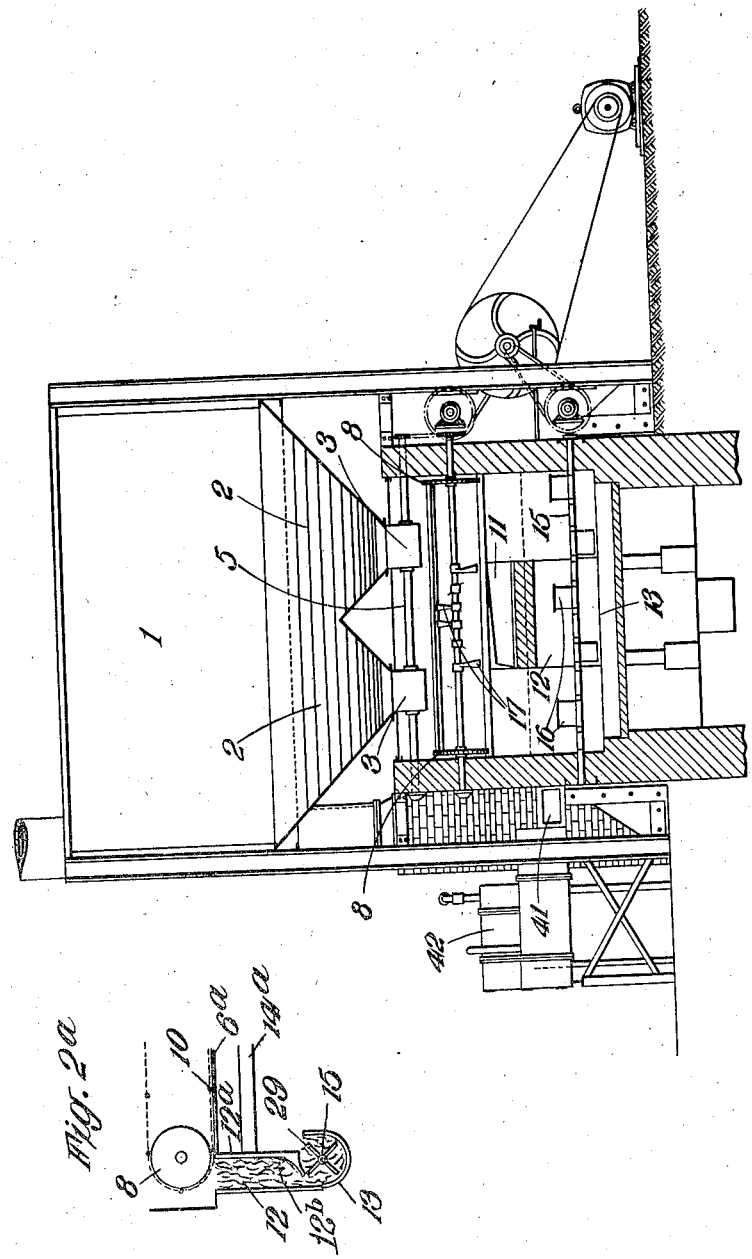

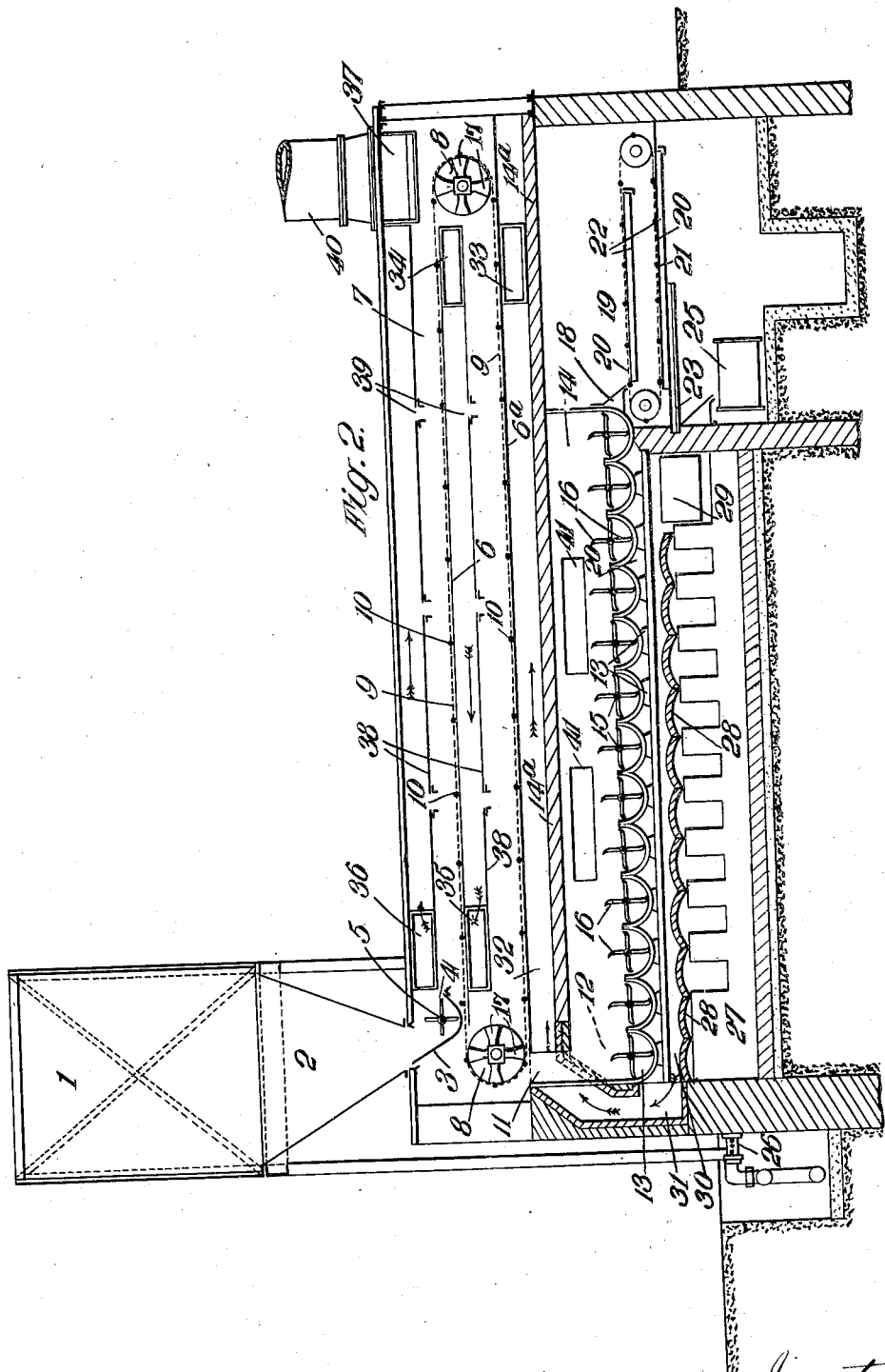

Patented Oct. 20, 1931

1,828,683

UNITED STATES PATENT OFFICE

EDOARDO MICHELE SALERNI, OF PARIS, FRANCE, ASSIGNOR TO E. M. S. INDUSTRIAL PROCESSES LIMITED, OF LONDON, ENGLAND, A CORPORATION OF ENGLAND

DISTILLATION OR HEAT TREATMENT OF CARBONACEOUS OR LIKE MATERIALS

Application filed January 6, 1927, Serial No. 159,401, and in Great Britain September 15, 1926.

This invention relates to apparatus for the distillation or heat treatment of carbonaceous or like materials of the kind which is described in the specification of Salerni's English Patent No. 247300, and to improved methods of dealing with carbonaceous materials, which methods require the devising of the improved apparatus for the practical execution of the methods.

According to the present invention a continuous method of drying and distilling solid carbonaceous and like materials is carried on by crushing the material into small pieces; moving the crushed material in a thin layer and in a continuous manner over a flat metal plate or plates in a drying chamber in thermal contact with and in counter-current to the waste heating gases used for distillation or carbonizing purposes; passing the material from the drying chamber through a gas tight seal into an externally heated distillation or carbonizing chamber, and while subjecting it to progressively increasing temperatures, maintaining it in constant movement; discharging the spent material from the distillation chamber; withdrawing from the distillation chamber the volatile constituents yielded up during the heat treatment and passing them while still hot through a dust extractor on their way to condensing means.

The distillation chamber may comprise a series, or a plurality of superimposed series, of metal troughs located side by side. The troughs may be located under a common roof, the latter being preferably composed of refractory material and each trough contains a combined rotary stirrer and scraper. The combustion chamber used for heating the apparatus is preferably divided from the distillation chamber by a layer of refractory material, such as a series of brick-work arches, an opening being provided at one end of the roof of the combustion chamber through which the hot gases enter a passage located beneath the bottom of the troughs in the distillation chamber and the top of the said combustion chamber and through this passage the hot gases flow in the opposite direction to the material in the distillation chamber and enter a passage leading to the drying chamber. The spent material may pass directly and in a continuous manner from the distillation chamber through a gas tight seal into a coke cooling chamber within which the material is moved in a thin layer or layers over a flat metal plate or plates and subjected to the influence of a cooling medium.

In order that the said invention may be clearly understood and readily carried into effect, the same will now be described more fully with reference to the accompanying drawings, in which:—

Figures 1 and 2 are a sectional end view and a longitudinal section respectively of an apparatus constructed according to one embodiment of the present invention.

Figure 2a is a diagrammatic illustration of a detail of the apparatus shown at Figures 1 and 2.

Referring to Figures 1 and 2, 1 is a bin containing the material which is to undergo treatment and which has been subjected to a preliminary crushing operation. Good results are obtained by reducing the material to such a size that it will pass through a sieve of ½" or ⅜" mesh or less. The small size of the material ensures an adequate degree of surface contact between it and the externally heated surfaces of the distillation chamber as also with the hot gases which pass through the drying chamber. It also provides an increased surface for evaporation and distillation; prevents overheating of part of the material and of the products of distillation, which overheating is inevitable if large pieces have to be dealt with, and secures an even flow of the material through the apparatus. The crushed material is elevated to the bin 1 by a conveyor and passes through two feed hoppers 2, 2, into troughs 3, 3 from which it is distributed by radial arms 4, 4 mounted on a shaft 5 onto the top plate 6 of the drying chamber 7. The rate at which the material is fed through the bin 1 and the troughs 3—3 should be correlated to the speed at which the material under treatment passes through the apparatus, which speed will vary, inter alia, with the particular material under treatment and the physical and calorific properties of the required product, the rate of speed being varied by varying the speed of the shaft 5 carrying the radial arms 4; it being understood, however, that sufficient material should be maintained in the troughs 3—3 to provide a substantially gas-tight seal. The drying chamber 7 contains two plates 6, 6a and a conveyor constituted by a pair of chain wheels 8, 8 on which a pair of endless chains 9, 9 are mounted. The endless chains 9, 9 carry cross bars 10, 10 disposed between the same which feed the material in the form of a thin layer along the upper plate 6 to the further end thereof where it falls onto the lower plate 6a and passes with the reversal of feed to an opening 11. Thereafter it passes through a gas tight seal 12 (see particularly Fig. 2a) into the first trough of the series 13, 13, located within the distillation chamber 14. One or both of the shafts by which the chain wheels 8, 8, are driven may carry a number of radial arms 17, 17, which (see Fig. 1) in the event of the material caking serve to break up or disintegrate the mass as it passes from the upper plate 6, to the lower plate 6a and also before it passes through the seal 12 into the distillation or carbonizing chamber 14. The gas tight seal 12 is constituted by a partition plate 12a which extends into the first trough of the series and the height of which from the base of the retort can be adjusted as desired. The crushed material 12b itself serves as the luting material and prevents any of the vapours in the distillation chamber 14 from passing into the drying chamber 7. In the example shown thirteen troughs are provided and located side by side in the same plane under a common roof 14a composed of refractory material, each trough 13 being provided with a combined scraper and stirrer or agitator constituted by a centrally disposed shaft 15 provided with paddles 16, 16 located close to one another in different planes, and normal to the shaft 15. The material passes laterally from trough to trough of the series and finally, after it has yielded up its volatile constituents, the solid residue passes through a gas tight seal 18 into the coke cooling chamber 19. The coke cooling chamber 19 contains a pair of chains 20, 20 carrying transversely disposed members 21, 21, which scrape the material along the surfaces of the water cooled plates 22, 22, in a similar manner to the endless chains described with reference to the drying chamber. The coke after it has been cooled down falls through an opening 23 onto an endless band 25 by means of which it is removed from the cooling chamber. In the arrangement shown the troughs 13, 13, are heated externally by gas and air burners 26 disposed in a combustion chamber 27. The combustion chamber has a roof 28 composed of a series of brickwork arches and the products of combustion leave the chamber by an opening 29 and enter a passage 30 disposed beneath the troughs 13, 13. After passing beneath the troughs 13, 13. After passing externally of the retorts 13, 13, the combustion gases enter the passage 31 and flowing therethrough enter a duct 32 beneath the bottom plate 6a of the preliminary dryer. Thereafter the products of combustion pass laterally through an opening 33 in the wall of the apparatus and re-enter the drying chamber beneath the upper plate 6 at the point 34. After passing beneath the upper plate 6 the gases re-enter the dryer above the plate 6 through openings 35 and 36 and the products of combustion finally pass through an opening 37 to the chimney 40. Disposed around the plates 6 and 6a in the drying chamber are a pair of plates 38, 38 provided with openings 39. Owing to the provision of these plates and the openings 39, 39, the draught or suction produced by the chimney or stack 40 will cause any vapour or steam yielded up during the drying operation to flow along with the products of combustion to the chimney 40. The volatile constituents yielded up in the distillation chamber are prevented by means of the gas tight seals 12 and 18 from entering the coke cooling chamber 19 or the drying chamber 7 and said volatile constituents are drawn off laterally and while still hot through dust extractors 41, 41 to a condenser 42.

These dust-extractors may be of any suitable construction but those of the baffle type, constructed in the manner described in my English Patent No. 247,274 of 1926, are preferred.

The condenser 42 may be of any suitable type, but condensers constructed in the manner described in my English Patent No. 247,275 of 1926 represent the preferred form of such condensers.

The semi-cylindrical troughs 13 may be of mild steel and of different sizes, according to requirements. A suitable size of trough for carbonizing non-caking coal is 10 feet long with a radius of 8 inches. For bituminous coals, the radius may be reduced to 5 inches and the trough shortened. The paddles 16, 16 may revolve at any required speed and their action is threefold: (1) To cause the material in the troughs to move along from trough to trough; (2) to keep it in constant motion so that it behaves like an emulsion or a liquid; (3) to keep clean the inside metallic surfaces and so secure an efficient heat interchange. Each paddle 16 terminates in a scraper whose function is to remove from the bottom and sides of the troughs 13, 13 any graphite, etc., which might tend to form. The scrapers are readily replaceable when wear makes renewal necessary. The first trough is fed automatically and continuously from the pre-drying chamber located above the retorts.

The material used in the apparatus should be of small dimensions and it has been found that to secure an even flow the best size of particles is from approximately ⅜ of an inch downwards. The material, after being reduced to a suitable size, is taken to the bin 1 by an elevator (not shown) and fed on to the plates 6 and 6a on the drying chamber to a thickness of about one inch. The material is passed at any desired rate by the conveyor along the top plate 6 and returns along the second lower plate 6a so that the conveyor is active on both journeys. The material is fed continuously through the seal 12 into the first trough 13 of the series.

The hot gases used in the apparatus may be derived from any outside source, or by burning the gas evolved in the process or by means of solid fuel—coal of a poor quality serving the purpose quite well. As the heating chamber is divided from the troughs in the distillation chamber by a series of brick arches, the flames do not play directly thereon. This arrangement minimizes wear and secures an even distribution of heat. From the heating or combustion chamber the gases proceed through the by-pass 31 and along the bottom of the troughs which form what is virtually a corrugated retort. The last trough of the series at the semi-coke exit is heated by the hottest gases which may enter the passage beneath the troughs at a temperature of approximately 700° C. It has been found that by maintaining the carbonaceous material in constant motion so that it is not left in contact with the hot metal, it does not reach a temperature of more than 500° to 550° C. The temperature of the heating medium taken above the material in the troughs has been found to be approximately 450° C., and is the highest temperature to which the products of distillation are exposed. The hot gases enter the drier at a temperature of from 300° to 400° C. and leave the drier at 80° C.

The distillation products are passed through the dust extractor before condensation takes place and from the dust extractors the hot gases and vapours may pass through impact water-cooled condensers of the type previously described, where the primary tar is condensed. To facilitate condensation and to economize water, the condensers may be superimposed upon a vertically disposed cylinder of large cross sectional area and containing baffle plates. This cylinder serves as a pre-condenser for the tar oils, the lighter fractions excepted. The condensers may be provided with means for effecting decantation of the warm tar. The rich gas which is left may be scrubbed and stripped and finally passes to a gas holder.

The carbonized material may be discharged continuously from the last trough 13 of the series on to the cooled chain conveyor in the coke cooled type. In cases where hollow plates are provided as in the examples illustrated the semi-coke is discharged from the coke cooled in a perfectly dry condition and nearly pulverized, at any temperature from 500° C. downwards as may be arranged for. The step of cooling the coke can be omitted in cases where the hot material is used for the direct feeding of steam boilers, thus effecting considerable economy in view of the dryness and temperature of the fuel.

It has been found that an installation consisting of a single retort with 12 troughs, each 10 feet long and 8 inches in radius, can deal with 75 tons of coal per 24 hours, which for its size is a very considerable throughput in comparison with other plants. It is to be noted that the total weight undergoing carbonization at any moment is low compared to the total amount carbonized. In other words the plant is small for a high capacity. Drying has been found to occupy from 1 to 2 hours, according to the moisture content of the material, and carbonization about the same time, according to the nature of the material.

The plant itself is simple in construction and very compact. All the essential parts are of metal and very little brickwork is required. The parts are easily renewed, and the whole interior is readily accessible for cleaning. The plant may be taken down without difficulty, moved, and re-erected if necessary. The original cost and the upkeep are both low in comparison with other processes. The plant is extremely flexible, as it is possible to vary the rate of charging, of drying, of heating, and of carbonizing. The size of the troughs can be varied to suit particular materials, and once fixed the depth may be increased by the addition of a cap fixed lengthwise along the common edge of two contiguous troughs. The plant can be designed without variation of principle to deal with other materials such as lignite, oil shales, non-coking and bituminous coals, all varying in their moisture, plasticity, and volatile contents.

What I claim and desire to secure by Letters Patent of the United States is:—

1. A method of distilling solid carbonaceous materials which consists in crushing the material to pass an approximately ½" square mesh screen substantially as described, whereby an adequate degree of surface contact for subsequent heat treatments is insured, a sufficient exposed superficial surface for evaporation and distillation is provided, and an even and easy flow of the material is secured; introducing the crushed material in a positive manner and at a controlled rate correlated to the rate at which the material passes through all subsequent stages of its treatment to an atmosphere inert to the material being treated and having a temperature adapted to cause evaporation of water from the material but lower than a distillation temperature, moving the material slowly in successive superimposed horizontal planes through said atmosphere until the material is relatively dry; subjecting the material toward the end of at least one of the successive horizontal movements to the action of mechanically disruptive force; feeding the dry material into a gas seal and from the gas seal into an atmosphere heated to the distillation temperature; moving the material in a generally horizontal direction and under agitation through said atmosphere under the influence of progressively increasing temperatures to cause the evolution of products of distillation, the water vapor released from the material during its drying treatment being continuously removed at a plurality of points, each located closely adjacent a definite portion of the material under treatment, discharging the spent solid product and collecting the distillate; and correlating the rate at which the material is passed through the drying operation to the rate at which the material is passed through the distilling operation so that there will be fed through the seal a relatively constant supply of the dried material at a rate consonant with that of the distilling operation.

2. Apparatus for distilling solid carbonaceous materials, comprising in combination, a distilling chamber, a drying chamber located above the distilling chamber, the two chambers together constituting a unit of apparatus, the said drying chamber provided with an inlet for the crushed materials to be treated, distributing means located in the said inlet for positively feeding to the dryer at a controllable rate the materials, a series of super-imposed shelves in the drying chamber to support the materials therein, means operative upon the upper surface of each shelf to agitate and convey the materials in a continuous manner from the upper primary shelf of the series to a successive lower shelf, means for disintegrating the body of material in its passage between the shelves of the dryer, an outlet for the materials from the dryer communicating with the distilling chamber, a gas seal in said outlet, heat supplying means located beneath the distilling chamber, and means whereby the waste heated gases used for distillation purposes are caused to pass in a counter direction to the passage of the materials, whereby the materials are subjected to a progressively increasing temperature on their passage through the apparatus.

EDOARDO MICHELE SALERNI.